United States Patent [19]

Rathay et al.

[11] Patent Number: 5,104,091
[45] Date of Patent: Apr. 14, 1992

[54] SPRING ASSISTED BALL VALVE

[75] Inventors: Gerald V. Rathay, Suffield; Leon Stoltze, Hartland, both of Conn.

[73] Assignee: United Technologies Corporation, Hartford, Conn.

[21] Appl. No.: 699,822

[22] Filed: May 14, 1991

[51] Int. Cl.⁵ .............................................. F16K 31/06
[52] U.S. Cl. ................. 251/121.14; 137/901; 251/337
[58] Field of Search ............... 137/901, 539; 251/337, 251/129.14

[56] References Cited

U.S. PATENT DOCUMENTS

| | | | |
|---|---|---|---|
| 2,400,817 | 5/1946 | Fox et al. | 137/539 X |
| 2,629,007 | 2/1953 | Forman | 251/129.14 X |
| 2,868,494 | 1/1959 | Kearns, Jr. et al. | 251/129.14 X |
| 2,916,045 | 12/1959 | Auch | 251/337 X |
| 3,437,082 | 4/1969 | Bouwkamp et al. | 137/539 X |
| 3,704,705 | 12/1972 | Eckhart | 128/736 |

Primary Examiner—Arnold Rosenthal
Attorney, Agent, or Firm—Dominic J. Chiantera

[57] ABSTRACT

A center flow ball valve assembly includes a pre-loaded spring positioned in line with the valve fluid inlet port for seating the ball in the valve orifice, the spring configured in stepped diameter coil sctions including a smaller diameter ball mounting section for cradling the ball and a larger diameter pedestal section which straddles the inlet port, the spring, with actuation of the ball valve permitting fluid to pass with minimum pressure drop through an unobstructed circumferential path between the different diameter coil sections.

8 Claims, 1 Drawing Sheet

U.S. Patent
Apr. 14, 1992
5,104,091
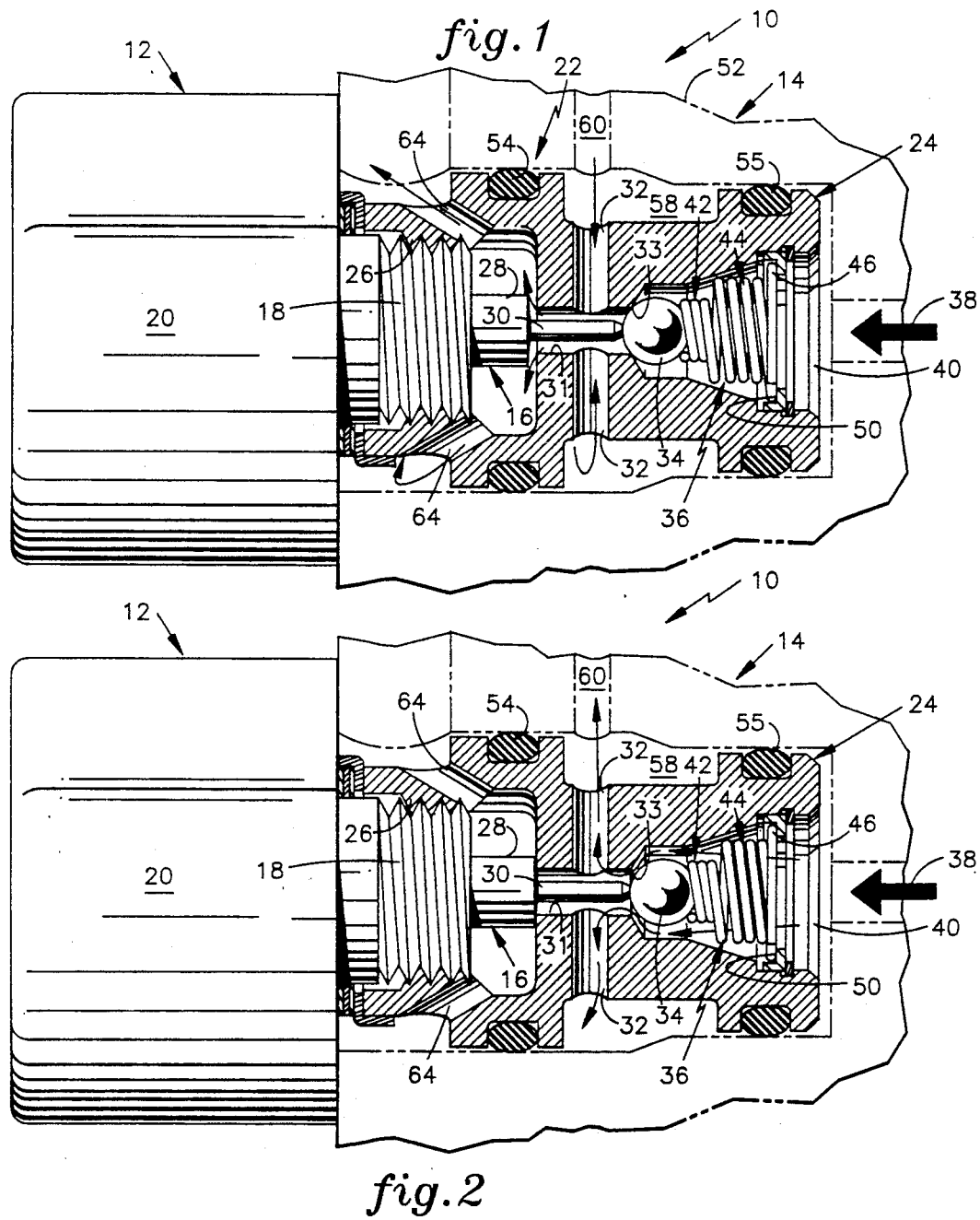
fig.1
fig.2
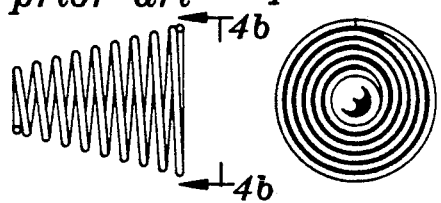
fig.4a prior art    fig.4b prior art
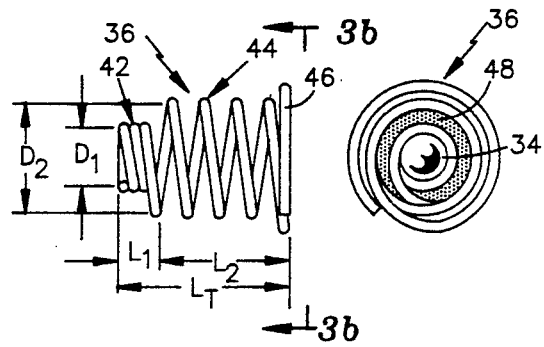
fig.3a    fig.3b

SPRING ASSISTED BALL VALVE

DESCRIPTION

1. Technical Field

This invention relates to spring assisted ball valves, and more particularly to ball valves in which the ball spring mechanism is positioned in the fluid flow path through the valve.

2. Background Art

As known, spring assisted ball valves are used in pneumatic and hydromechanical systems to provide bistable (on/off) control of fluid flow. The fast response and positive shut-off characteristics of the valve, coupled with its simple actuation system and high reliability make it a popular choice for use in aircraft applications. These include fluidic systems for controlling propeller blade pitch.

In a ball valve assembly, fluid flow through a throat portion of the assembly's valve chamber is regulated by alternate positioning of a ball located in the chamber. In a quiescent state, the ball is seated in a seal located at the throat opening, thereby blocking flow. In this state the ball is maintained in position by the force of a pre-loaded spring and the applied fluid pressure. The compressed pre-load of the spring is sufficient to seat the ball in in the absence of applied fluid. A solenoid is used to displace the ball from the seal. When energized the solenoid overcomes the spring force and fluid pressure to force the ball from the seat, allowing fluid flow around the ball and through the throat orifice.

When de-energized, the solenoid shaft retracts allowing the spring and fluid pressure to re-seat the ball. The fluid pressure provides the principle force in seating the ball, thereby providing the valve's fail-safe characteristic, but the spring provides assistance. The spring also ensures capture of the ball in the chamber in the event that fluid pressure is lost. A known problem with the spring, however, is the possibility of deformation or dislocation of the spring within the chamber during actuation. Either one can cause the spring to jam the ball in the open position. It is known, therefore, to provide some means of capturing the spring in its mount.

Known methods of providing spring stability include use of a spring guide pin, or retainer, as in the hydraulic valve assemblies disclosed in U.S. Pat. Nos. 4,977,927 and 4,365,648. The spring is slipped over the guide pin guide which protrudes up inside the spring for a distance less than the spring's maximum compression length. The pin prevents lateral movement of the spring, and spring distortion with actuation of the valve. The guide pin, however, is mounted to the valve housing; within the area of the spring seat. It requires a solid mounting surface and can only be used in valve assemblies in which the fluid flows around the periphery of the spring seat and over the outside of the spring.

Spring stabilization is even more important in those valves having fluid flow through the central bore of the valve housing, i.e. a central flow valve. In this type of valve the spring is directly in the fluid flow path. With the ball open the fluid flows through the compressed spring, creating a pressure drop across the spring, and severe spring turbulence.

One method of providing spring stability in this type valve is shown in U.S. Pat. No. 4,893,650 which discloses a central flow hydraulic valve. There a single diameter spring is seated in the flow channel, over the inlet orifice. A cage, in the form of a thimble with slotted sides is fitted over the ball end of the spring with the sides extending down over the spring coils for a distance less than the pre-loaded compressed length of the spring. When the ball is actuated the thimble comes in contact with the inlet surface and the fluid flows through the spring seat and the thimble slots to the ball valve. Although stable, the thimble slows the response time of the valve which makes this approach unsatisfactory for high speed pneumatic controls.

Another known stability approach for central flow pneumatic valves is the use of a conical spring. There, the apex of the spring engages the ball and the broad base of the cone taper straddles the fluid inlet. This provides lateral stability of the spring at a lower cost than that of the '650 reference cage structure. Elimination of the cage structure also reduces the fluid pressure drop and increases valve response time. However, an undesirable characteristic of the conical spring is that with actuation of the valve and the subsequent ensuing flow, the spring coils collapse within each other such that the spring imposes a continuously decreasing flow area to the fluid flowing through the coils, resulting in a continuously increasing pressure drop across the spring body. In high pressure fluid applications this may cause dislocation of the spring.

DISCLOSURE OF INVENTION

The object of the present invention is to provide a spring assisted ball valve assembly with high spring stability, while providing little or no obstruction to the fluid flow through the spring.

According to the present invention, a ball valve assembly includes: a solenoid for actuating the ball valve, a valve chamber having a fluid inlet port positioned opposite to a valve orifice, a ball valve adapted to seat in fluid sealing relationship in the orifice, and a continuous coil spring fitted in pre-load compression between the fluid inlet port and the ball valve, the spring having stepped diameter coil sections, including a smaller diameter ball mounting section for cradling the ball valve and a larger diameter pedestal section for straddling the inlet port; the assembly characterized by the ball mounting section comprising inactive helical coils and the pedestal section comprising active helical coils with a maximum slenderness ratio (ratio of spring length to mean diameter) of 2.0.

In still further accord with the present invention, the pedestal section has a spring index (ratio of mean coil diameter to wire diameter) in the range of from four to twelve. In still further accord with the present invention, the spring coil wire comprises AMS 5688 stainless steel wire.

The present invention provides a fast response, high reliability ball valve assembly. The stepped diameter design of the spring assist mechanism is simple, but provides improved spring stability at a lower cost than possible with prior art designs.

These and other objects, features and advantages of the present invention will become more apparent in light of the following detailed description of a best mode embodiment thereof, as illustrated in the accompanying Drawing.

BRIEF DESCRIPTION OF DRAWING

FIG. 1 is a side elevation view, partially in section, of the ball valve assembly of the present invention;

FIG. 2 illustrates a breakaway of the elevated section of FIG. 1, with the ball valve in a different operating state;

FIG. 3 is is an elevated side view of the spring assist mechanism used in the embodiment of FIG. 1; and FIG. 4 is an elevated side view of a prior art spring assist mechanism used in connection with the description of the present invention.

BEST MODE FOR CARRYING OUT THE INVENTION

In FIG. 1 the illustrated embodiment of the present invention is to a ball valve useful in a variable pitch propeller aircraft to control blade pitch. The ball valve assembly 10, includes a solenoid (or electro-mechanical actuator) 12 and a valve housing 14 (shown in section). The solenoid is of a type known in the art for use in aircraft applications. It includes a linearly reciprocating plunger 16 which passes through a threaded section 18 of the solenoid housing 20. The solenoid provides linear displacement of the plunger along the solenoid longitudinal axis when energized with an applied DC voltage signal; typically 20–30 VDC for aircraft applications.

The valve housing 14 includes a recessed mounting chamber 22 and a valve chamber 24 formed at opposite ends thereof. The mounting chamber includes internal threads 26 which receive the threaded section 18 of the solenoid housing 20, providing a mechanical mounting of the solenoid housing to the valve housing. With connection of the two housings the solenoid plunger 16 slips into the mounting chamber.

The plunger includes a segmented shaft having a large diameter barrel 28 and a smaller diameter stem 30. With the two housings fitted together the stem extends into a fluid aperture 31 located within the mounting chamber in axial alignment with the solenoid shaft. The aperture 31 passes through the interior of the valve housing, intersecting a crossing fluid aperture 32, and passing through the intersection to connect the interior of the mounting chamber with that of the valve chamber 24. The apertures 31, 32 provide the valve assembly's fluid communication between the ball valve and exterior fluid elements (not shown), as described in detail hereinafter.

The aperture 31 is provided with a sealing surface at each end. The diameter of the aperture is larger than the shaft stem 30 diameter but smaller than that of the barrel 28. When the solenoid is energized the barrel shoulder contacts the aperture opening, which provides a positive limit on the solenoid's maximum shaft stroke length. The shoulder surface of the barrel is finished with a bevel so that shoulder to aperture contact provides a fluid tight seal.

The opening of the aperture 32 into the mounting chamber 24 forms a valve orifice 33. The orifice is finished to provide a surface seal, and in the quiescent state a ball valve 34 is seated against the orifice seal. The ball and aperture opening geometry are selected to provide a fluid tight seal when the ball is in contact with the surface seal of the opening. The ball is typically low chromium, high carbon steel (AMS 7440), bearing quality (AMS 6440), or equivalent. The ball is maintained against the seal by the combined force of a spring 36 and the pressure gradient 38 of the fluid applied to a fluid inlet port 40.

Referring to FIG. 3, the spring 36 is a continuous coil which is wound in two operating sections 42, 44. Depending on the mounting chamber geometry, the spring may also include a spring seat section 46. The ball mounting section 42 comprises a cylindrical helix with a mean coil diameter $D_1$, and at least two inactive (incompressible) coil windings. The value $D_1$ is selected to provide cradling of the ball 34 within the spring's top coil. The pedestal section 44 is an active coil helix having at least three active coil windings and a mean diameter $D_2$ which is greater than $D_1$.

The value of $D_2$ is selected to provide a flow section area 48 (shown in FIG. 3(B)) sufficient to permit the fluid volume passing through the valve to pass through the section area 48 with minimum pressure drop across the spring 36. The approximate section area is equal to the product of the constant Pi multiplied by the difference value (Delta D) between the inner diameter value of $D_2$ ($ID_2$) and the outer diameter value of $D_1$ ($OD_1$). In FIG. 3(B) the ball 34 is shown inserted in the mounting section to emphasize the fact that the fluid passage can only occur through the flow section area 38.

In the ball valve assembly 10 of FIG. 1, the spring has a free length (the uncompressed spring length of both operating sections 42, 44, and the spring seat 46) $L_T = 0.300$ in.; with the free length of the ball mounting section 42, $L_1 = 0.075$ in., and the free length of the pedestal section 44 and spring seat 46, $L_2 = 0.225$ in. As stated hereinbefore, the spring seat section illustrated in FIG. 3 is flared to accommodate the geometry of the valve chamber and the inlet port 40. In preferred embodiment the pedestal section would incorporate the spring seat coil (equal diameter) within the section free length $L_2$. Therefore, the nominal free length ratio of the pedestal section to the mounting section is $L_2/L_1 = 3.0$ (three), and may range from 0.5 (one-half) to 10.0 (ten).

In the present embodiment the nominal value of the spring wire diameter $WD = 0.0180$ in., $D_1 = 0.103$ in., $OD_1 = 0.121$ in., $D_2 = 0.192$ in., and $ID_2 = 0.174$ in.. The mean diameter ratio $D_2/D_1 = 1.86$, the value of Delta $D = 0.053$ in. and the area of the flow section 48 is $A = 0.167$ in.$^2$. In the present invention the ratio of the mean coil diameters of the pedestal section to the ball mounting section is always greater than 1.0.

In consideration of spring stability, the pedestal section has a slenderness ratio (the ratio of the pedestal length $L_2$ to the pedestal mean coil diameter—$L_2/D_2$) which is a maximum of two (2.0). The pedestal also has a spring index (the ratio of the pedestal mean coil diameter to the wire diameter—$D_2/WD$) in the range of from four (4.0) to twelve (12.0).

For comparative purposes, FIGS. 4(A) and (B) illustrate the side and base elevation views, respectively, of a prior art conical spring sized for use in the valve assembly of FIG. 1. As shown in FIG. 4(B) the coils spiral in the cone taper such that when placed in compression with valve actuation, the fluid must flow through the spacing between the coils. It must be remembered that the ball is seated at the apex of the coil, blocking any flow through the top of the spring. This results in a substantial pressure drop across the spring, and creates severe spring turbulence. In contrast, the present valve spring provides channeling of the fluid through the pedestal section together with essentially unobstructed flow through the flow section area 48 (FIG. 3(B)).

As known to those skilled in the art, the actual coil wire size and coil diameters of the present spring will differ with different ball valve embodiments, and will depend on the spring performance requirements for each different type of ball valve application. Similarly, the preferred coil material is 400 stainless steel, AMS 5688, or equivalent. However, such different spring materials may be used as may be known for use by those skilled in the art for particular valve applications and performance requirements.

Referring again to FIG. 1, the spring 36 is positioned in the fluid inlet port with the spring seat section 46 bearing on a shelf 50 fitted in the opening of the inlet. The flared spring seat section is required in the FIG. 1 valve assembly due to the interior taper of the valve chamber. In an alternative embodiment, the chamber wall may be made substantially cylindrical in the area of the pedestal 44, allowing an increase of the pedestal coil mean diameter to permit the section to straddle the inlet 40 directly. This allows for an increased flow area (48, FIG. 3(B)) and a further simplified spring construction.

In the embodiment of FIG. 1 the valve assembly 10 functions within a parent control system 52 (shown in partial, phantom section) related to an auto-feather system which controls the blade pitch angle of a propeller aircraft. The valve is fitted within a recess of the system 52. Sealing "O" rings 54, 55 create a fluid reservoir 58 in the cavity between the valve housing 14 and the wall of the recess. The reservoir is in fluid communication with the valve's aperture 32 and with fluid aperture 60 formed in the parent system housing.

The aperture 60 connects (not shown) to the spool of the feather valve associated with the blade pitch control. With the ball 34 seated in the valve orifice 33 the feather valve is vented (follow the arrows) through the reservoir 58 and the ball valve apertures 32 and 31 to the recessed mounting chamber interior, and then through passage 64 to atmosphere. This disables blade feathering. In the presence of a blade pitch command to feather the prop, the solenoid 12 is energized to actuate the ball valve.

FIG. 2 shows the ball valve in the actuated position. The solenoid drives the stem 30 through the aperture 31 until the shoulder of the barrel 28 seals the aperture opening. The stroke displacement is on the order of 0.020 in. to 0.030 in. As shown by the arrows, the high pressure fluid from the inlet 40 passes through the pedestal section 44 and flow area (48, FIG. 3(B)) of the spring 36, around the spring's mounting section 42, around the ball 34, and through the valve orifice 33. The aperture 31, sealed from atmosphere by the barrel of the solenoid shaft, couples the pressurized fluid to aperture 32, through the reservoir and passage 60 to the feather valve. The high pressure fluid displaces the feather valve's spool to actuate feathering of the propeller blades. With a fluid pressure of 600 PSI the system reaction time is in the range of milliseconds.

The present invention provides a ball valve assembly with an improved, high reliability spring mechanism suitable for use in high speed, high fluid pressure applications. The exact coil dimensions, wire size, and coil diameters will vary with valve sizing and fluid pressure requirements. In each case, however, the dual diameter segments provide channeling of fluid through the spring pedestal section, and minimal obstruction to the flow through the flow area between the mounting and pedestal sections.

Similarly, although the invention has been disclosed with respect to a best mode embodiment thereof, it should be understood by those skilled in the art that the foregoing and various other changes, omissions, and additions in the form and detail thereof may be made therein without departing from the spirit and scope of the invention.

We claim:

1. A ball valve assembly, for providing gate control of pressurized fluid flowing therethrough in response to gate signals presented thereto, comprising:

valve housing means, enclosing a valve chamber and a mounting chamber interconnected by a fluid passage which terminates in a valve orifice in said valve chamber, said valve chamber further including a fluid inlet positioned opposite said valve orifice for receiving pressurized fluid;

ball means, adapted to seat in fluid sealing relationship in said valve orifice;

solenoid means, mounted within said recessed mounting chamber, and having a shaft disposed within said fluid passage, for displacing said ball from said valve orifice in response to the presence of a gate signal; and a spring coil winding having stepped diameter coil sections, including a smaller diameter ball mounting section to cradle said ball and a larger diameter pedestal section to straddle said fluid inlet, and fitted between said fluid inlet and said ball to maintain seating of the ball in the orifice;

as characterized by:

said ball mounting section comprising inactive helical coil windings having a mounting section mean coil diameter value and a mounting section free coil length value, and said pedestal section comprising three or more active helical coil windings having a pedestal section mean coil diameter value, a pedestal section free coil length value, and a slenderness ratio, defined as said pedestal section free coil length value divided by said pedestal section mean coil diameter value, which is a maximum of two (2.0).

2. The valve assembly of claim 1, wherein said pedestal section has a spring index in the range of from four (4.0) to twelve (12.0).

3. The valve assembly of claim 1, wherein said spring coil winding comprises AMS 5688 stainless steel wire.

4. The valve assembly of claim 1, wherein the ratio of said pedestal section free coil length value divided by said mounting section free coil length value is in the range of from one half (0.5) to ten (10.0).

5. A spring assembly, adapted to fit between the ball valve and the fluid inlet of a ball valve assembly to provide seating of the ball in the assembly's valve orifice, the spring comprising a coil winding having stepped diameter coil sections, including a smaller diameter ball mounting section to cradle the ball and a larger diameter pedestal section to straddle the fluid inlet, said ball mounting section comprising inactive helical coil windings having a mounting section mean coil diameter value and a mounting section free coil length value, and said pedestal section comprising three or more active helical coil windings having a pedestal section mean coil diameter value, a pedestal section free coil length value, and a slenderness ratio, defined as said pedestal section free coil length value divided by said pedestal section mean coil diameter value, which is a maximum of two (2.0).

6. The spring assembly of claim 5, wherein said pedestal section has a spring index in the range of from four (4.0) to twelve (12.0).

7. The spring assembly of claim 5, wherein said spring coil winding comprises AMS 5688 stainless steel wire.

8. The spring assembly of claim 5, wherein the ratio of said pedestal section free coil length value divided by said mounting section free coil length value is in the range of from one half (0.5) to ten (10.0).

* * * * *